(12) United States Patent
Wang et al.

(10) Patent No.: US 10,755,390 B2
(45) Date of Patent: Aug. 25, 2020

(54) IMAGE DEBLURRING METHOD BASED ON LIGHT STREAK INFORMATION IN AN IMAGE

(71) Applicant: PEKING UNIVERSITY SHENZHEN GRADUATE SCHOOL, Shenzhen (CN)

(72) Inventors: Ronggang Wang, Shenzhen (CN); Xinxin Zhang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 101 days.

(21) Appl. No.: 16/098,732

(22) PCT Filed: Jul. 15, 2016

(86) PCT No.: PCT/CN2016/090091
§ 371 (c)(1),
(2) Date: Nov. 2, 2018

(87) PCT Pub. No.: WO2017/190432
PCT Pub. Date: Nov. 9, 2017

(65) Prior Publication Data
US 2019/0139199 A1    May 9, 2019

(30) Foreign Application Priority Data
May 3, 2016  (CN) .......................... 2016 1 0284962

(51) Int. Cl.
*G06T 5/00*     (2006.01)
*G06T 5/20*     (2006.01)
*G06T 5/30*     (2006.01)

(52) U.S. Cl.
CPC ................ *G06T 5/003* (2013.01); *G06T 5/20* (2013.01); *G06T 5/30* (2013.01);
(Continued)

(58) Field of Classification Search
CPC .. G06T 5/003; G06T 5/20; G06T 5/30; G06T 2207/30241; G06T 2207/20201;
(Continued)

(56) References Cited

U.S. PATENT DOCUMENTS

| | | | |
|---|---|---|---|
| 2011/0229044 A1 | 9/2011 | Yang et al. | |
| 2015/0172547 A1* | 6/2015 | Wang ................. | H04N 5/23267 348/208.4 |
| 2016/0063670 A1* | 3/2016 | Wilensky ........... | H04N 5/23229 348/578 |

FOREIGN PATENT DOCUMENTS

| | | |
|---|---|---|
| CN | 102509281 A | 6/2012 |
| CN | 103337057 A | 10/2013 |
| CN | 105139348 A | 12/2015 |

OTHER PUBLICATIONS

Zhang, Haichao, David Wipf, and Yanning Zhang. "Multi-image blind deblurring using a coupled adaptive sparse prior." Proceedings of the IEEE Conference on Computer Vision and Pattern Recognition. 2013. (Year: 2013).*
Rob Fergus et al., "Removing Camera Shake from a Single Photograph," ACM Trans. Graph, vol. 25, pp. 787-794, 2006.
Dilip Krishnan et al., "Fast Image Deconvolution using Hyper-Laplacian Priors," in Advances in Neural Information Processing Systems 22, pp. 1033-1041, 2009.
(Continued)

*Primary Examiner* — Amandeep Saini
(74) *Attorney, Agent, or Firm* — Miles & Stockbridge P.C.

(57) ABSTRACT

An image deblurring method based on light streak information in an image is provided, wherein shape information of a blur kernel is obtained based on a light streak in a motion blur image and image restoration is constrained by combining the shape information, a natural image and the blur kernel to thereby obtain an accurate blur kernel and a high-quality restored image. The method specifically com-
(Continued)

prises: selecting an optimum image patch including an optimum light streak; extracting shape information of a blur kernel from the optimum image patch including the optimum light streak; performing blur kernel estimation to obtain the final blur kernel; performing non-blind deconvolution and restoring a sharp restored image as a final deblurred image. The present disclosure establishes a blurry image test set of captured images including light streaks and a method to obtain an accurate blur kernel and a high quality restore image.

9 Claims, 5 Drawing Sheets

(52) U.S. Cl.
CPC ............... *G06T 2207/20016* (2013.01); *G06T 2207/20044* (2013.01); *G06T 2207/20201* (2013.01); *G06T 2207/30241* (2013.01)

(58) Field of Classification Search
CPC . G06T 2207/20044; G06T 2207/20016; G06T 2207/20021
USPC .......................................................... 382/255
See application file for complete search history.

(56) References Cited

OTHER PUBLICATIONS

Binh-Son Hua et al., "Interactive Motion Deblurring Using Light Streaks," 18th IEEE International Conference on Image Processing, pp. 1553-1556, 2011.
Zhe Hu et al., "Deblurring Low-light Images with Light Streaks", IEEE Conference on Computer Vision and Pattern Recognition, pp. 3382-3389, 2014.
Oliver Whyte et al., "Deblurring Shaken and Partially Saturated Images", IEEE International Conference on Computer Vision Workshops, pp. 745-752, 2011.
Sunghyun Cho et al., "Handling Outliers in Non-Blind Image Deconvolution," IEEE International Conference on Computer Vision, pp. 495-502, 2011.
Xinxin Zhang et al., "Image Deblurring Using Robust Sparsity Priors", IEEE, pp. 138-142, ICIP 2015.
Qi Shan et al., "High-quality Motion Deblurring from a Single Image," ACM Transactions on Graphics, vol. 27, No. 3, Article 73, pp. 73:1-73:10, Aug. 2008.
Li Xu et al., "Unnatural L0 Sparse Representation for Natural Image Deblurring," IEEE Conference on Computer Vision and Pattern Recognition, 2013, pp. 1107-1114.

* cited by examiner

IMAGE DEBLURRING METHOD BASED ON LIGHT STREAK INFORMATION IN AN IMAGE

CROSS-REFERENCE TO RELATED APPLICATIONS

The present application is a national stage filing under 35 U.S.C. § 371 of PCT/CN2016/090091, filed on Jul. 15, 2016 which claims priority to CN Application No. 201610284962.3 filed on May 3, 2016. The applications are incorporated herein by reference in their entirety.

FIELD

Embodiments of the present disclosure generally relate to the technical field of image processing, specifically relate to an image enhancement processing method, and more particularly relate to an image deblurring method based on light streak information in an image, which performs motion deblurring to the image using a light streak in a blurry image so as to restore a high-quality image.

BACKGROUND

Certain motion blur often occurs to a captured image due to relative movement between a camera and a scene to capture. A model of image degradation may be expressed into the following convolution process $$I = L \otimes k + N \quad (1)$$

where I denotes a captured blurry image, L denotes a latent image, k denotes a blur kernel (a point spread function, PSF), N denotes a noise of an image capturing device, and $\otimes$ denotes a convolution operator. In equation (1), only the blurry image I is known, such that a process of solving L by single image blind deconvolution is a highly ill-posed problem.

When a light source or a reflective object (e.g., water face, metal, glass, etc.) is present, the high-luminance points will form a light streak on an image, seriously degrading image quality. A blurry image with a light streak is a special case of motion blur images. In this case, if the luminance of the point light source or reflective point is so high to exceed a sensor threshold in an imaging device such that saturated pixels are formed on an imaging plane, each sensor response will be equal to a sensor saturation response, resulting in equation 2:

$$k_1 = k_2 = \ldots = k_w = \ldots k_n = \text{sensor saturation response} \quad (2)$$

At this point, the blur model does not satisfy the linear convolution model of equation (1) and thus cannot be represented by convolution. A motion trajectory of a saturated target point along the camera on the imaging plane forms a light streak. Due to a relatively large contrast with a background region, the light streak has noticeable edges, while these noticeable edges will affect an edge map for estimating the blur kernel, leading to inaccurate estimation of the blur kernel. However, the light streak also provides useful information for blur kernel estimation.

Single image deblurring has attracted the attention of more and more researchers, and significant progress has been made. Because only a blurry image is known while what to obtain are a blur kernel and an unknown latent image, by constraining the unknown image based on the blur kernel characteristics such as sparsity and natural image statistical characteristics such as gradient distribution, the blur kernel and an intermediate image may be obtained; meanwhile these constraints may prevent trapping of the solving into local minima, which guarantees the blur kernel sparsity and denoises the restored image. In Literature [1], Fergus et al. took the initiative to take the blur kernel as a function to estimate the blur kernel using an ensemble learning method, where a variational Bayesian approach is adopted and a heavy-tailed distribution model of natural image gradients is represented with a Gaussian hybrid model. However, this method is relatively complex and has a very slow image processing process. In Literature [2], Krishnan et al. assumes a hyper-Laplacian distribution of the gradients of L, obtaining a high-quality restored image; the hyper-Laplacian constraint as an effective constraint is extensively applied to subsequent deblurring work.

Currently, not so many achievements in the researches on deblurring a blurry image including a light streak are available at home and abroad. Although the light streak includes much useful information (e.g., shape information of the blur kernel), such information is not effectively utilized in most deblurring algorithms. In Literature [3], Hua & Low manually selected a light streak region and used it to constrain the blur kernel; however, the manually selected image patch is not surely an image region suitable for constraining the blur kernel, which is highly dependent on human priors. In Literature [4], Hu et al. proposed an algorithm to deblur a night scene blurry image using light streak information, where an optimum light-streak image patch was automatically selected, and blur kernel estimation was performed in conjunction with other image priors; however, false detection and missed detection often occur to that method. Because the saturated pixels disrupt the linear convolutional model, the traditional deconvolution algorithm is not suitable for restoring such pictures. To address this issue, Whyte et al. in Literature [5] established a forward model to eliminate a ringing effect triggered by the saturated pixels. Cho et al. In literature [6] removed the saturated pixels to perform deconvolution operation using non-saturated pixels.

In view of the above, it is seen that single-image motion deblurring has received extensive attention, and many motion deblurring algorithms with significant application values have come out. A blurry image with a light streak provides blur kernel information. However, currently there still lacks a method of sufficiently extracting the light streak information in a blurry image, performing blur kernel estimation with the information to motion deblur the image, and thereby restoring a high-quality image.

BIBLIOGRAPHIES

[1] R. Fergus, B. Singh, and A. Hertzmann, "Removing camera shake from a single photograph," *ACM Trans. Graph*, vol. 25, pp. 787-794, 2006

[2] D. Krishnan and R. Fergus, "Fast image deconvolution using hyper-laplacian priors," in NIPS, 2009, pp. 157-170

[3] B.-S. Hua and K.-L. Low. "Interactive motion deblurring using light streaks," In ICIP, pp. 1553-1556, 2011.

[4] Z. Hu, S. Cho, and J. Wang. "Deblurring low-light images with light streaks", In CVPR, pp. 3382-3389, 2014.

[5] O. Whyte, J. Sivic, and A. Zisserman, "Deblurring shaken and partially saturated images", In ICCV Workshops, pp. 745-752, 2011.

[6] S. Cho, J. Wang, and S. Lee. "Handling outliers in non-blind image deconvolution," In ICCV, pp. 495-502, 2011.

[7] X. Zhang, R. Wang, and Y. Tian. "Image deblurring using robust sparsity priors", in ICIP, pages 138-142, 2015.

[8] Q. Shan, J. Jia, and A. Agarwala, "High-quality motion deblurring from a single image," ACM Trans. Graph, vol. 27(3), pp. 73, 2008.

[9] L. Xu, S. Zheng, and J. Jia, "Unnatural 10 sparse representation for natural image deblurring," in CVPR, 2013, pp. 1107-1114.

SUMMARY

To overcome the drawbacks in the prior art, the present disclosure provides an image deblurring method based on light streak information in an image, where an accurate blur kernel and a high-quality restored image are obtained by: obtaining shape information of the blur kernel based on a light streak in a motion blur image and constraining image restoration by combining the shape information, a natural image and other priors of the blur kernel.

The present disclosure provides a robust deblurring technology for a blurry image including a light streak. The technology mainly includes three parts: light-streak image patch selection, blur kernel estimation, and image restoration. As to light-streak image patch selection, the present disclosure provides a method of selecting an optimum light streak, including: manually selecting an image patch including a light streak; then extracting shape information of a blur kernel from the optimum light streak through procedures of skeletonization and morphological operation, constraining a latent image and the blur kernel by combining the extracted shape information with a natural image and priors of the blur kernel, and estimating the blur kernel through iterative computations; finally, adopting a non-blind deconvolution method that may process saturated pixels to restore a final sharp image.

A technical solution of the present disclosure is provided below:

An image deblurring method based on light streak information in an image, wherein shape information of a blur kernel is obtained based on a light streak in a motion blur image and image restoration is constrained by combining the shape information, a natural image and the blur kernel to thereby obtain an accurate blur kernel and a high-quality restored image, comprising steps of:

1) selecting an optimum image patch including an optimum light streak;

2) extracting shape information of the blur kernel from the optimum image patch including the optimum light streak, comprising steps of:

21) setting a luminance threshold;

22) setting luminance of pixels whose luminance is lower than the luminance threshold to 0, and adjusting a central point of the optimum light streak to a central position of the optimum image patch;

23) setting luminance of all pixels whose luminance is lower than or equal to 0 to 0 and the luminance of those pixels whose luminance is greater than 0 to 1, and converting the optimum image patch into a binary image; and 24) performing a skeletonization operation to the binary image (which may be implemented with bwmorph in MATLAB) to obtain a single-pixel-width binary image, representing a motion trajectory of a capturing device as a shape of the blur kernel; finally performing a dilation operation (which may be implemented with imdilate in MATLAB) on the single-pixel-width binary image to constrain the shape of the blur kernel, where a dilation model is a disc model with a radius of ⅕ of a shorter edge of the blur kernel, a result (obtained after dilation of the single-pixel-width motion trajectory) being represented as a matrix T.

3) blur kernel estimation: combining the shape information of the blur kernel obtained in step 2) and sparse priors to constrain the blur kernel, and iteratively computing an intermediate image and the blur kernel to obtain a final blur kernel, comprising steps of:

31) firstly, establishing an image pyramid, and inputting the image as the original blur image I; initializing the blur kernel k into a 5×5 matrix, which is obtained after downsampling a skeletonized matrix; upsampling the blur kernel obtained in the upper-layer image as the initial blur kernel for the current iteration procedure;

A blur kernel estimation model is represented by equation 3:

$$\min_{L,k} \|L \otimes k - I\|_2^2 + \gamma \|\nabla L\|^\alpha + \lambda_1 \|M \circ k\|_2^2 + \lambda_2 \|k\|_1 \quad (3)$$

$$M = J - T$$

where ∘ denotes a Hadamard product; $\gamma$, $\lambda_3$, and $\lambda_2$ are weight coefficients; J is an all-ones matrix; T is a result of dilating the single-pixel-width motion trajectory; the first term $\|L \otimes R - I\|_2^2$ is a numerical fidelity term, which satisfies a blurry image degradation model; the second term $\gamma \|\nabla L\|^\alpha$ is a global constraint term for a latent image, causing the gradient statistical distribution of the restored sharp image to obey a "heavy-tailed model," wherein $0<\alpha<1$, and in this embodiment $\alpha=0\beta$; the third term $\lambda_1 \|M^\circ k\|_2^2$ constrains the shape of the blur kernel using a mask M, causing the shape of the blur kernel approximate to the shape of the light streak as much as possible; and the fourth term $\lambda_2 \|k\|_1$ is a sparsity constraint term;

32) solving the optimized energy equation (3), iteratively computing L and K, and estimating a final blur kernel.

The optimized energy equation (3) may be solved through the steps below:

321) in the equation (3), when k is known (initializing the blur kernel k into a 5×5 matrix), simplifying the equation (3) into:

$$\min_L \|L \otimes k - I\|_2^2 + \gamma \|\nabla L\|^\alpha \quad (4)$$

322) with L being known, computing k, $$\min_k \|L \otimes k - I\|_2^2 + \lambda_1 \|M \circ k\|_2^2 + \lambda_2 \|k\|_1 \quad (5)$$

However, this complex equation cannot be directly solved.

323) therefore, a substitution w is introduced to substitute $M^\circ k$ in equation (5), resulting in:

$$\min_k \|L \otimes k - I\|_2^2 + \lambda_1 \|w\|_2^2 + \lambda_2 \|k\|_1 + \lambda_3 \|M \circ k - w\|_2^2 \quad (6)$$

then, k and w are iteratively solved.

First, with w being known, solve k:

$$\min_k \|L \otimes k - I\|_2^2 + \lambda_2 \|k\|_1 \quad (7)$$

k may be solved using the IRLS (Iteratively reweighted least squares). Then, with k being known, solve w:

$$\min_k \lambda_1 \|w\|_2^2 + \lambda_3 \|M \circ k - w\|_2^2 \quad (8)$$

obtaining w as:

$$w = \frac{\lambda_3 M \circ k}{\lambda_1 + \lambda_3} \quad (9)$$

In an embodiment of the present disclosure, the times of iteration is set to 20; after 20 times iterating the equation 5 and the equation 9, k is obtained;

324) iteratively (in this embodiment, the iteration times is set to 5) computing the equation 4 and the equation 5 to solve the final blur kernel k.

4) non-blind deconvolution: restoring a sharp restored image through a non-blind restoration algorithm as a final deblurred image.

In the present disclosure, the sharp image is restored using the non-blind restoration algorithm proposed by Cho et al. in Literature 6 (S. Cho, J. Wang, and S. Lee. "Handling outliers in non-blind image deconvolution," In ICCV, 2011). The non-blind restoration algorithm regards saturated pixel points and noise as singular points, processes the singular pixel points separately from other pixel points, iteratively optimizes the outliers (saturated pixels) and the restored image using the EM (Expectation-Maximization) algorithm, and finally obtains a high-quality restored image.

Compared with the prior art, the present disclosure has the following beneficial effects:

The present disclosure provides an image deblurring method based on light streak information in an image, wherein an accurate blur kernel and a high-quality restored image are obtained by: obtaining shape information of the blur kernel based on a light streak in a motion blur image and constraining image restoration by combining the shape information, a natural image and other priors of the blur kernel. The present disclosure has the following advantages:

(1) the present disclosure provides an optimum light streak selecting method to manually select an image patch including an optimum light streak.

(2) the present disclosure provides a blur kernel shape extracting method, which may extract shape information from the image patch including the optimum light streak, constrain the blur kernel using the shape information and other priors, and estimate an accurate blur kernel.

(3) the present disclosure establishes a blurry image test set of captured blurry images including light streaks, for testing the deblurring algorithm. For the blurry image test set, an accurate blur kernel and a high-quality restored image may be obtained using the image deblurring method based on light streak information in the image according to the present disclosure, which has a high application value in the field of image processing.

Figure 3:
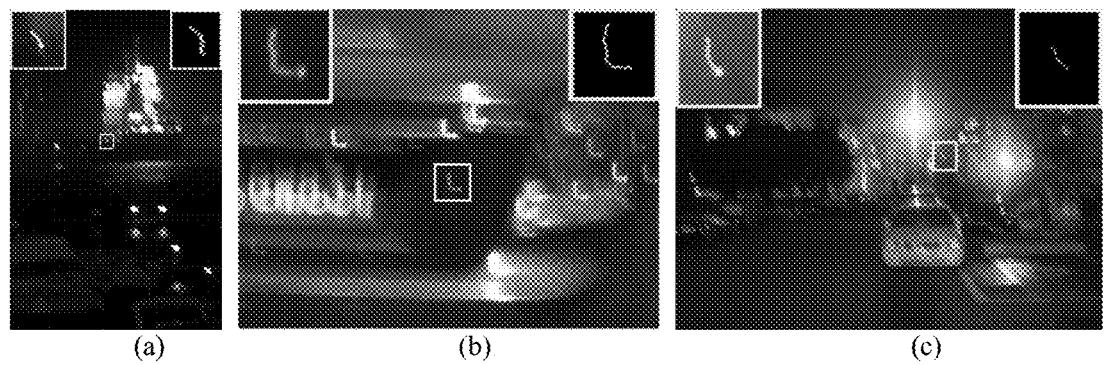

where (a) is a blurry image, (b) is a selected image block including a light streak, (c) c is a skeletonized result, (d) is a dilated result, (e) is an estimated blur kernel;

FIG. 3 is a screenshot of extracting a light streak shape from a low-luminance image in an embodiment of the present disclosure;

where the middle rectangular block in the image shows the selected optimum light streak image patch, the upper left corner rectangular block shows a scaled-up image of the optimum light streak image block, and the upper right corner rectangular block shows the extracted light streak shape diagram.

Figure 4:
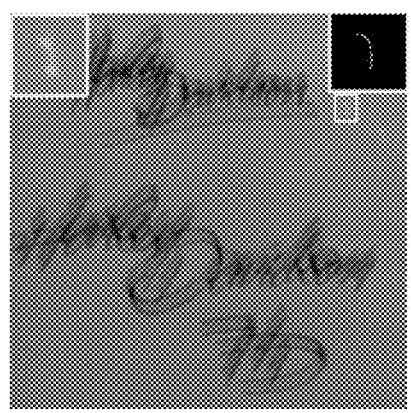

FIG. 4 is a screenshot of extracting a light streak shape from a normal luminance image in an embodiment of the present disclosure;

where the upper left corner rectangular block shows the selected light streak image patch, and the upper right corner rectangular block shows the extracted light streak shape diagram.

Figure 5:

FIG. 5 shows part of pictures in the blurry image test set adopted in the embodiments of the present disclosure.

Figure 6:
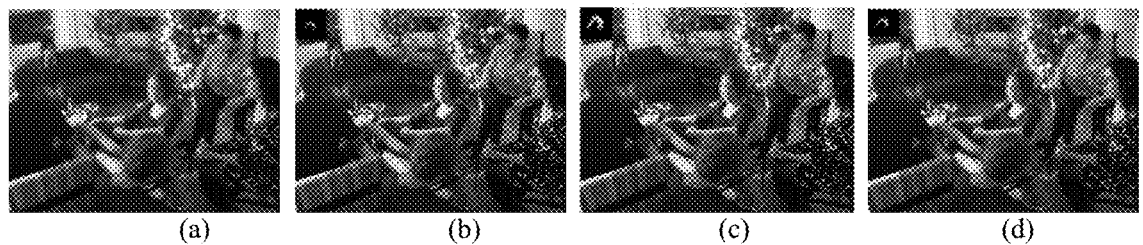

FIG. 6 shows results of blur kernel estimations and restoration results obtained with the prior methods and the present method in an embodiment of the present disclosure, respectively, where accuracies of blur kernel estimation are compared;

where (a) is a blurry image, the upper left corners of (b), (c), and (d) are blur kernels estimated by respective algorithms; Fig. (b) shows blur kernel estimations and restoration results obtained according to the method adopted by Zhang et al. (Literature [7]); Fig. (c) shows blur kernel estimations and restoration results obtained according to the method adopted by Hu et al. (Literature [4]); and Fig. (d) shows blur kernel estimations and restoration results obtained according to the present method.

Figure 7:
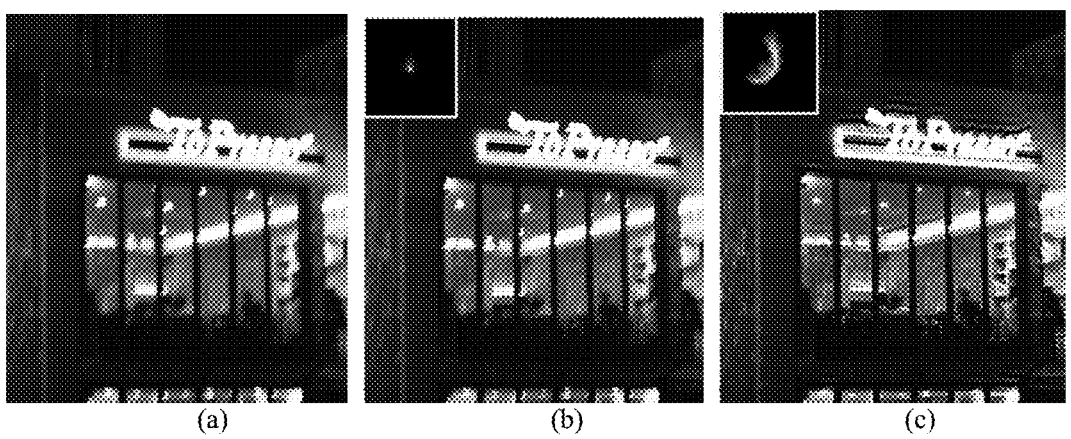

FIG. 7 shows results of blur kernel estimation and restoration results obtained with the prior methods and the present method in an embodiment of the present disclosure, respectively, showing impacts of the blur kernel shape constraint $\lambda_1 \|M \circ\|_2^2$ on blur kernel estimation;

where the upper left corners of (b) and (c) are estimated blur kernels; Fig. (a) shows a blurry image, Fig. (b) shows the blur kernel estimations and restoration results obtained by Zhang et al. according to the method in literature 7; and Fig. (c) shows blur kernel estimations and restoration results of the present disclosure.

Figure 8:
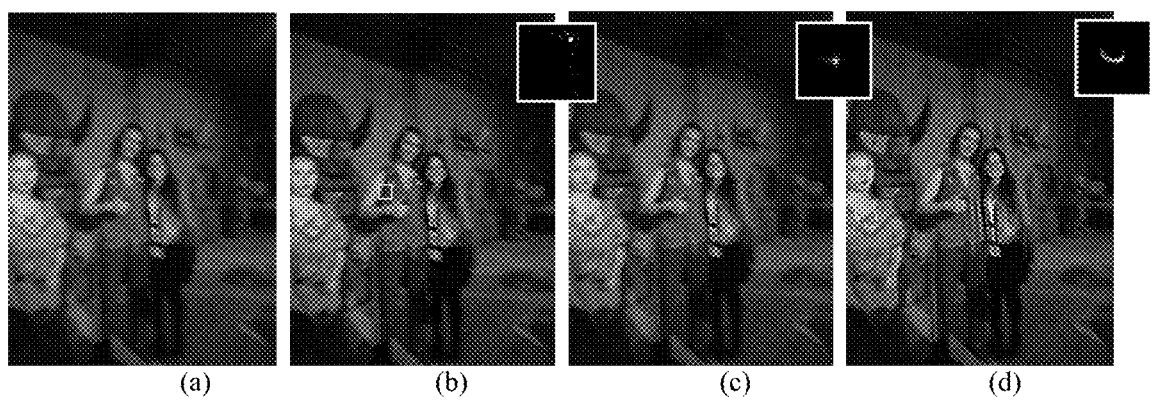

FIG. 8 shows a diagram of comparing the effects of deblurring actual images with the prior methods and the present method in an embodiment of the present disclosure, respectively;

where (a) is a to-be-processed blurry image; (b) is a deblurred result obtained by Hu et al. according to the method in literature [4]; (c) is a deblurred result obtained by Xu et al. according to the method in literature [8]; (d) is a deblurred result obtained according to the present method; and upper left corner rectangular blocks on the pictures in (b), (c), and (d) show blur kernels estimated by respective methods.

Figure 9:
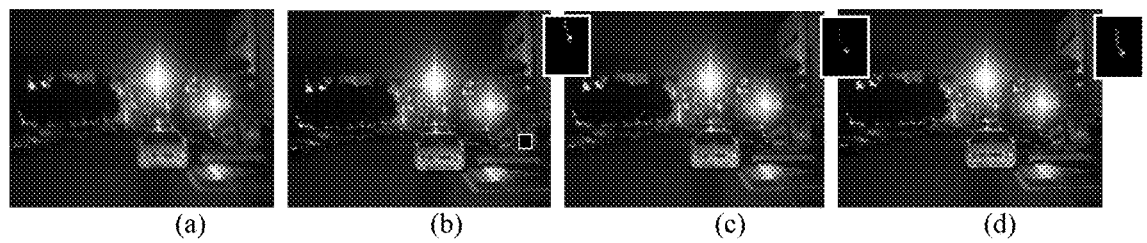

FIG. 9 shows a comparison diagram of effects of deblurring an actual image according to an embodiment of the present disclosure;

where (a) is a blurry image; (b) is a deblurred result obtained by Hu et al. according to the algorithm in literature [4]; (c) is a deblurred result obtained by Xu et al. according to the algorithm in literature [8]; (d) is a result obtained according to the present method; and upper left corner rectangular blocks on the pictures shown blur kernels estimated by respective algorithms.

Figure 10:
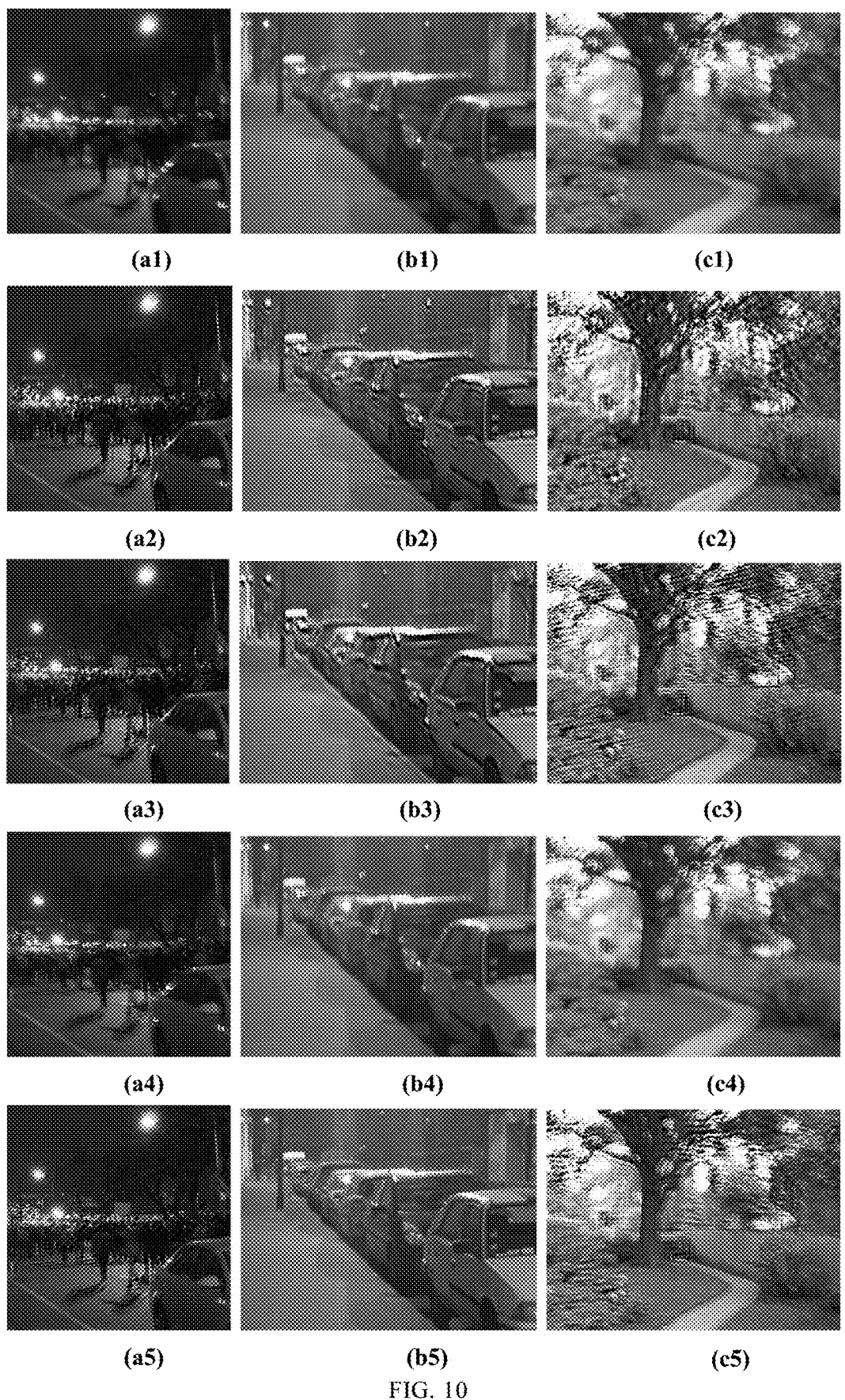

FIG. 10 shows a comparison diagram of effects of deblurring processing to the blurry image test set established by the present disclosure according to an embodiment of the present disclosure;

where (a1)~(c1) are blurry images, and (a2)~(c2) are deblurred results according to the method in literature [3]; (a3)~(c3) are deblurred results according to the method in literature [4], and (a4)~(c4) are deblurred results according to the method in literature [7]; and (a5)~(c5) are deblurred results according to the present method.

Figure 11:
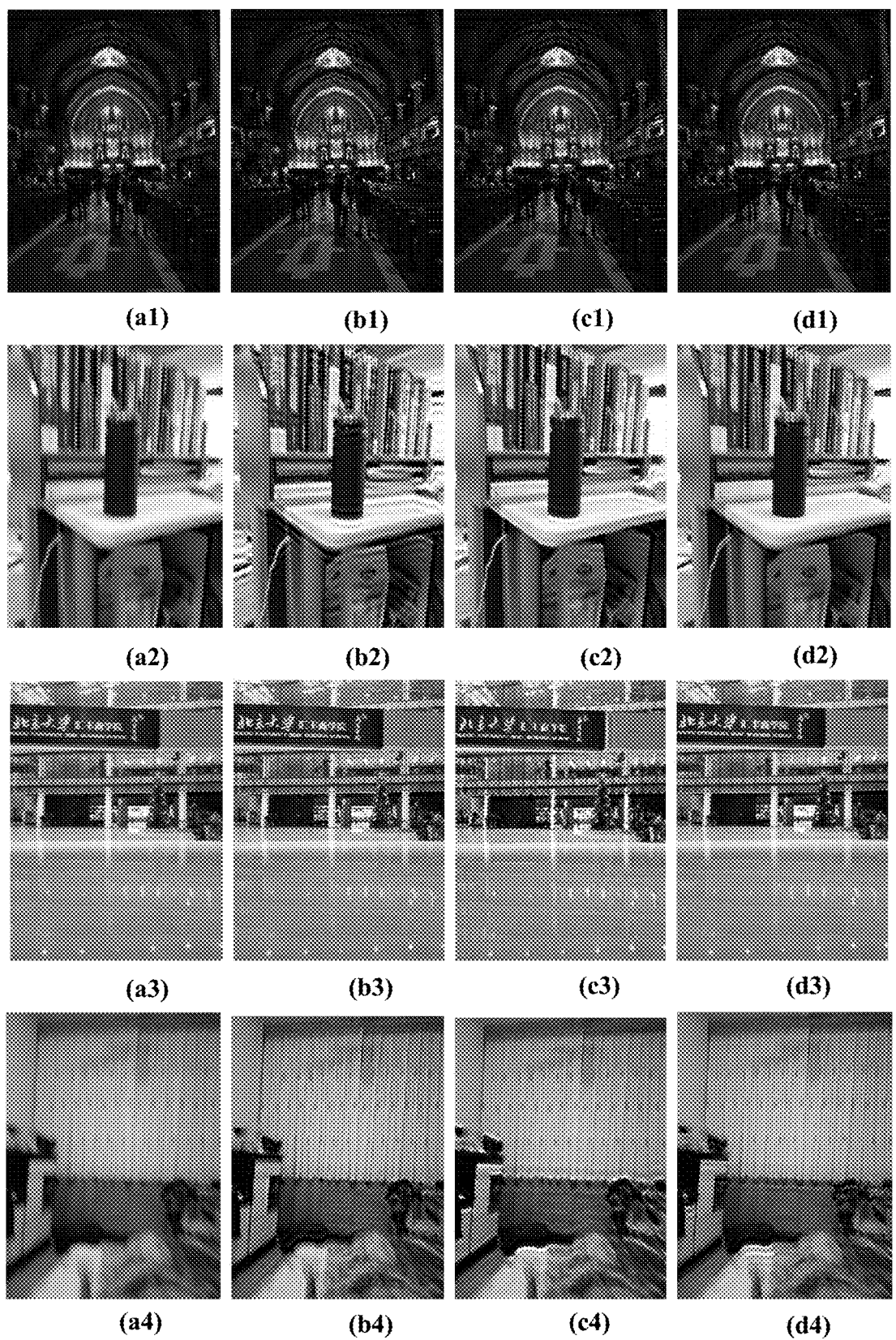

FIG. 11 shows a comparison diagram of effects of deblurring processing to the blurry image test set established by the present disclosure according to an embodiment of the present disclosure;

where (a1)~(a4) are blurry images, (b1)~(b4) are results according to the method of Hua et al. in literature [3]; (c1)~(c4) are results according to the method of Hu et al. in literature [4], and (d1)~(d4) are deblurred results according to the present method.

DETAILED DESCRIPTION OF EMBODIMENTS

Hereinafter, the present disclosure is further described through the embodiments, but the scope of the present disclosure is not limited by the embodiments.

The present disclosure provides an image deblurring method based on light streak information in an image, which obtains an accurate blur kernel and a high-quality restored image by: obtaining shape information of the blur kernel based on a light streak in a motion blur image and constraining image restoration by combining the shape information, a natural image and other priors of the blur kernel.

Figure 1:
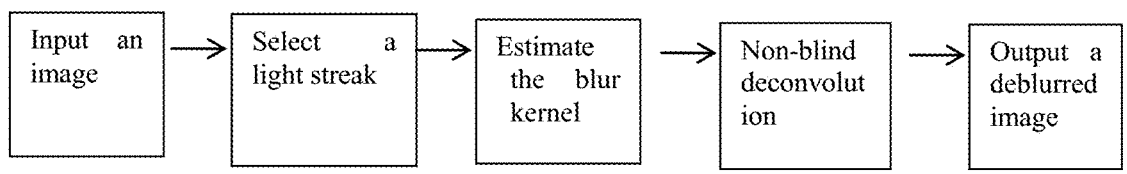
FIG. 1 is a flow block diagram of an image deblurring method for an image including a light streak according to the present disclosure.

In an embodiment of the present disclosure, a procedure of performing motion deblur to a to-be-processed blurry image is performed through the steps below to obtain a final deblurred image, as shown in FIG. 1:

Step 1: manually selecting an image patch including an optimum light streak.

In an embodiment of the present disclosure, an optimum image patch including an optimum light streak shall satisfy the following conditions in order to be manually selected:

(1) luminance of the light streak shall be far higher than that of its neighboring region;

the neighboring region refers to surrounding pixel points. In a specific implementation of the present disclosure, the light streak in the selected image patch comprises pixel points whose luminance is 70% higher than a maximum luminance value of the image patch; for example, the rectangular block in FIG. 3 shows the selected optimum light streak image patch.

(2) the light streak has a sparse distribution in the image patch, i.e., the light streak has a relatively small width;

The smaller width is termed relative to other high-luminance light streaks in the image; in the experiments of the present disclosure, for an 800×600 picture, the light streak is set to 5-pixel-width.

(3) each image patch has, and only has, one light streak;

An image patch is a rectangular area in the image, which includes a whole piece of light streak; for example, the rectangular block in FIG. 3 shows the selected optimum light streak image patch;

Based on the three characteristics above, a plurality of image patches including a light streak may be found, and an optimum image patch is selected therefrom. An optimum light streak shall further satisfy the following conditions:

(4) a shape of the light streak should be similar to that of most other light streaks in the image, so as to avoid confusion between the light streak and a streak-shaped luminous body region (a light source or a reflector) and thus avoid mistaken identification of the luminous body as the light streak;

(5) the luminance of the background portion of the image patch is relatively low, i.e., one or more image patches with the lowest background luminance are selected from all image patches satisfying the first to fourth conditions.

(6) except the light streak, no other structures with a close luminance to the light streak are existent in the image patch.

Other structures with a relatively high luminance include: a high-luminance luminous body, a plurality of light streaks included in one image patch, and a noticeable image edge, etc.

With the conditions above, an optimum light streak image patch may be manually selected.

Step 2: extracting shape information of a blur kernel. A blur kernel may be differentiated in terms of shape and luminance. An image patch including a light streak is selected based on the optimum light stream extracted in step 1, as shown in FIG. 2(b); then, a threshold is set, where a pixel value of a pixel whose luminance is lower than the threshold is set to 0, and a central point of the light streak is adjusted to a central position of the image patch; next, the pixel values of all pixels whose luminance is lower than 0 are set to 0, and those higher than 0 are set to 1; at this point, the image patch becomes a binary image; a skeletonization operation (which may be implemented by the bwmorph function in MATLAB) is performed to the binary image, obtaining a single-pixel-width binary image shown in FIG. 2(c), which is the desired motion trajectory of the capturing device, also the shape of the blur kernel; to constrain the shape of the blur kernel, a dilation operation (which may be implemented by the imdilate function in MATLAB) is performed to FIG. 2c, where the dilation model is a disc model with a radius of ⅕ of a shorter edge of the blur kernel, the result being shown in FIG. 2(d), where the matrix is represented by T.

FIG. 3 shows a light streak image patch selected from an input blurry image and a result of extracting a blur kernel shape from the light streak; it may be seen that the blur kernel shape at the upper right corner is consistent with that of the light streak. Different from the method adopted by Hu et al, no saturated light streaks are present in the blur image shown in FIG. 4, but there still exists a streak whose luminance in the rectangular block is higher than that of the background region, which streak records a motion trajectory of the capturing device. Shape information of the blur kernel may also be obtained using the blur kernel shape extracting method according to the present disclosure, as shown in the upper right corner of FIG. 4.

Step 3: blur kernel estimation. The blur kernel is constrained by combining the shape information obtained in step 2) and sparse priors, and a final blur kernel is obtained by iteratively computing an intermediate image and the blur kernel.

Figure 2:
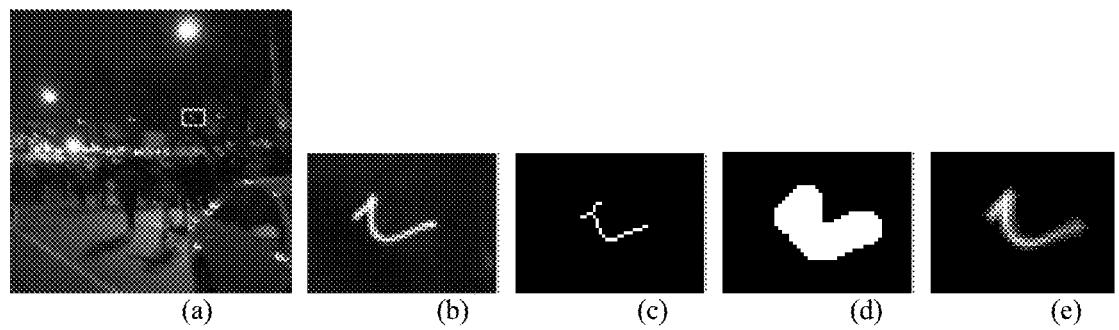
FIG. 2 is a screenshot of the procedure of extracting blur kernel shape information in an embodiment of the present disclosure.

Firstly, an image pyramid is established, where the image inputted is the original blur image I; the blur kernel k is initialized into a 5×5 matrix, which is obtained after downsampling a skeletonized matrix (shown in FIG. 2(c)). In the image pyramid, the blur kernel and the intermediate image computed at each layer are all upsampled as initial values of the blur kernel and intermediate image of a next fine layer.

A blur kernel estimation model is:

$$\min_{L,k} \|L \otimes k - I\|_2^2 + \gamma \|\nabla L\|^\alpha + \lambda_1 \|M \circ k\|_2^2 + \lambda_2 \|k\|_1 \quad (3)$$

$$M = J - T$$

where $\circ$ denotes a Hadamard product; $\gamma$, $\lambda_3$, and $\lambda_2$ are weight coefficients; J is an all-ones matrix; T is a result of dilating the single-pixel-width motion trajectory; the first term $\|L \otimes k - I\|_2^2$ is a numerical fidelity term, which satisfies a blurry image degradation model; the second term $\gamma \|\nabla L\|^\alpha$ is a global constraint term for a latent image, causing the gradient statistical distribution of the restored sharp image to obey a "heavy-tailed model," wherein $0<\alpha<1$, and in this embodiment $\alpha=0\beta$; the third term $\lambda_1 \|M \circ k\|_2^2$ constrains the shape of the blur kernel using a mask M, causing the shape of the blur kernel approximate to the shape of the light streak as much as possible; and the fourth term $\lambda_2 \|k\|_1$ is a sparsity constraint term.

A final blur kernel is estimated by solving the optimized energy equation (4) and iteratively computing L and K, In equation (3), if k is known (initializing the blur kernel k into a 5×5 matrix, which is obtained by downsampling the skeletonized matrix (as shown in FIG. 2(c)), then the equation (3) is simplified as:

$$\min_{L} \|L \otimes k - I\|_2^2 + \gamma \|\nabla L\|^\alpha \quad (4)$$

with L is known, computing k, $$\min_{k} \|L \otimes k - I\|_2^2 + \lambda_1 \|M \circ k\|_2^2 + \lambda_2 \|k\|_1 \quad (5)$$

However, this complex equation cannot be directly solved. Therefore, a substitution w is introduced to substitute $M \circ k$ in equation (5), resulting in:

$$\min_{k} \|L \otimes k - I\|_2^2 + \lambda_1 \|w\|_2^2 + \lambda_2 \|k\|_1 + \lambda_3 \|M \circ k - w\|_2^2 \quad (6)$$

then, iteratively solving k and w.
First, with w being known, solving k:

$$\min_{k} \|L \otimes k - I\|_2^2 + \lambda_2 \|k\|_1 \quad (7)$$

where k may be solved using the IRLS (Iteratively reweighted least squares) method. then, with k being known, solving w:

$$\min_{k} \lambda_1 \|w\|_2^2 + \lambda_3 \|M \circ k - w\|_2^2 \quad (8)$$

obtaining w as:

$$w = \frac{\lambda_3 M \circ k}{\lambda_1 + \lambda_3} \quad (9)$$

the times of iteration is set to 20; after 20 times of iterating the equation (5) and the equation (8), k is obtained and then the final blur kernel k is solved by iteratively computing the equations (4) and (5) for five times.

Step 4: non-blind deconvolution. In the present disclosure, the latent image is restored using the non-blind restoration algorithm proposed by Cho et al. in Literature 6 (S. Cho, J. Wang, and S. Lee. "Handling outliers in non-blind image deconvolution," In ICCV, 2011). Cho et al. regards the saturated pixel points and noise as singular points, and processing the singular pixel points separately from other pixel points. The outliers (saturated pixels) and the restored image are iteratively optimized using an Expectation-Maximization (EM) algorithm. Finally, a high-quality restored image is obtained.

After the above four steps, a final deblurred image is obtained.

To test the efficacy of the present disclosure, the present disclosure establishes a blurry image test set of captured blurry images including light streaks, and the deblurring algorithm provided by the present disclosure is tested on this test set, and meanwhile a comparative experiment with the currently common deblurring algorithms is undertaken.

The test set for subjective testing includes 25 pictures with different blur degrees captured by digital cameras or mobile phones in different scenes. Each image includes one or more high-luminance light streaks. Part of the pictures in the test set are shown in FIG. 5.

Experiments are conducted on the blurry image test set of captured blur images established by the present disclosure so as to be intuitively compared with blur degrees, noises, and rings of restored images obtained by other algorithms. When comparing with the other algorithms, the adjustable parameters in other algorithms are adjusted to be optimum.

FIG. 6 compares the results of blur kernel estimations between Hu et al. [4], Zhang et al. [7], and the present disclosure, as shown in the upper left corner of the figure. The present disclosure performs shape constraining to the blur kernel using the light streak, which is the biggest difference from the blur kernel estimation algorithm of Zhang et al.; comparison between FIGS. 6(b) and 6(d) shows that the blur kernel shape obtained according to the algorithm of the present disclosure is closer to the light streak shape in the figure, and the restored image is sharper with less rings. Compared with FIG. 6(c), although the blur kernel shape in FIG. 6(c) is closer to the light streak on a Christmas tree, but has noticeable rings compared with the restoration result of the present disclosure, because the present disclosure combines the light streak information and other priors for iterative computation during the blur kernel estimation and the blur kernel is corrected in each iteration process to thereby achieve an optimal result. In FIG. 7, the algorithm of Zhang et al. [7] is compared with the technology of the present disclosure. The present algorithm performs shape constraining to the blur kernel during the blur kernel estimation process based on the shape information extracted from the light streak, i.e., a constraint term $\lambda_1 \|M \circ k\|_2^2$ is utilized, which is a major difference from the blur kernel estimation method of Zhang et al. [7]. It is seen that the blur kernel estimated by Zhang et al. [7] is largely discrepant from the actual blur kernel, and the image restored thereby is still very blurry, while the blur kernel estimated by the present algorithm has an accurate shape, and the quality of the restored image is noticeably enhanced.

FIGS. 8 and 9 are comparison diagrams of the deblur effects of the actually captured blurry images including a light streak between the present algorithm and currently popular algorithms, where (a) is a blurry image; (b) is a deblurred result obtained according to the algorithm of Hu et al. in literature [4]; (c) is a deblurred result obtained according to the algorithm of Xu et al. in literature [9]; (d) is a deblurred result obtained according to the present algorithm; and the upper left corner rectangular blocks on the pictures show blur kernels estimated by respective algorithms. The rectangular block in FIG. 8 shows the optimum light streak image patch manually selected; the shapes of the blur kernels estimated by Hu et al. [4] and Xu et al. [9] are largely discrepant with the shape of the actual blur kernel, nearly without any deblur effect; in contrast, the shape of the blur kernel estimated by the present disclosure is consistent with the shape of the light streak, and a human face may be clearly identified from the final restored image.

The images in FIG. 10 are pictures commonly used for subjective testing during the task of deblurring an image including a light streak. Among the images, the first row shows blurry images, the second row shows the deblur effects by Hua & Low, the third row shows the deblur effect of Hu et al., the fourth row shows deblur effects by Zhang et al., and the last row shows the results of the present algorithm. It may be seen that the algorithm of Zhang et al. almost has no deblur effect to the three images having a light streak; as to the algorithms of Hua & Low and Hu et al, although they make the blurry images sharper, they still have a serious ringing effect; in contrast, the sharp pictures obtained according to the present algorithm are clear with less rings, which may further restore the light streak to the original shape of the point source.

In addition, the present algorithm and those of Hua & Low and HU are also tested on the blurry image test set established by the Inventors, as shown in FIG. 11. Generally, the image ringing and noise restored by Hua & Low are very serious, and the ringing of Hu et al. is relatively serious with an over-enhancement effect for some images; in contrast, the present disclosure has less noise and ringing and the restored images are relatively clear.

It needs to be noted that the embodiments as disclosed are intended to facilitate further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. An image deblurring method based on light streak information in an image, wherein shape information of a blur kernel is obtained based on a light streak in a motion blur image and image restoration is constrained by combining the shape information, a natural image and the blur kernel to thereby obtain an accurate blur kernel and a high-quality restored image, comprising steps of:
   1) selecting an optimum image patch including an optimum light streak;
   2) extracting shape information of the blur kernel from the optimum image patch including the optimum light streak;
   3) performing blur kernel estimation by combining the shape information of the blur kernel obtained in step 2) and sparse priors to constrain the blur kernel, and iteratively computing an intermediate image and the blur kernel to obtain a final blur kernel; and
   4) performing non-blind deconvolution to thereby restoring a sharp restored image through a non-blind restoration algorithm as a final deblurred image.

2. The image deblurring method based on light streak information in an image according to claim 1, wherein the step 2) of extracting shape information of the blur kernel comprises steps of:
   21) setting a luminance threshold;
   22) setting a luminance of pixels whose luminance is lower than the luminance threshold to 0, and adjusting a central point of the optimum light streak to a central position of the optimum image patch;
   23) setting luminance of all pixels whose luminance is lower than or equal to 0 to 0 and luminance of pixels whose luminance is greater than 0 to 1, and converting the optimum image patch into a binary image; and
   24) performing a skeletonization operation on the binary image to obtain a single-pixel-width binary image, representing a motion trajectory of a capturing device as a shape of the blur kernel.

3. The image deblurring method based on light streak information in an image according to claim 2, wherein the skeletonization operation in the step 24) is implemented with a bwmorph function in MATLAB.

4. The image deblurring method based on light streak information in an image according to claim 1, wherein the shape of the blur kernel is constrained before step 3) by performing a dilation operation on a single-pixel-width binary image, wherein a dilation model is a disc model with a radius of ⅕ of a shorter edge of the blur kernel, and a result of dilating a single-pixel-width motion trajectory is represented as a matrix T.

5. The image deblurring method based on light streak information in an image according to claim 4, wherein the dilation operation is implemented with a imdilate function in MATLAB.

6. The image deblurring method based on light streak information in an image according to claim 1, wherein the step 3) of performing blur kernel estimation comprises steps of:
   31) establishing an image pyramid by inputting the image as the original blurry image denoted as I; initializing the blur kernel denoted as k into a 5×5 matrix; using an upsampled blur kernel obtained in an upper-layer image as an initial blur kernel for the current iteration process; and with an optimized energy equation (3) as a model for blur kernel estimation, performing blur kernel estimation through the model for blur kernel estimation:

$$\min_{L,k} \|L \otimes k - I\|_2^2 + \gamma \|\nabla L\|^\alpha + \lambda_1 \|M \circ k\|_2^2 + \lambda_2 \|k\|_1 \quad (3)$$

$$M = J - T$$

where ∘ denotes a Hadamard product; γ, $\lambda_3$, and $\lambda_2$ are weight coefficients; J is an all-ones matrix; T is a result of dilating the single-pixel-width motion trajectory; the first term $\|L \otimes k - I\|_2^2$ is a numerical fidelity term, which satisfies a blurry image degradation model; the second term $\gamma \|\nabla L\|^\alpha$ is a global constraint term for a latent image, causing the gradient statistical distribution of the restored sharp image to obey a "heavy-tailed model," wherein $0<\alpha<1$; the third term $\lambda_1\|M^\circ k\|_2^2$ constrains the shape of the blur kernel using a mask M, causing the shape of the blur kernel to be approximately the same as the shape of the light streak; and the fourth term $\lambda_2\|k\|_1$ is a sparsity constraint term, 32) solving the optimized energy equation (3), iteratively computing L and K, and estimating a final blur kernel;

the optimized energy equation (3) being solved through steps of:

321) in the optimized enemy equation (3), when k is known, initializing the blur kernel k into a 5×5 matrix, and simplifying the optimized energy equation (3) into Equation (4):

$$\min_L \|L \otimes k - I\|_2^2 + \gamma \|\nabla L\|^\alpha \qquad (4)$$

322) with L being known, computing k through Equation (5), $$\min_k \|L \otimes k - I\|_2^2 + \lambda_2 \|M^\circ k\|_2^2 + \lambda_2 \|k\|_2 \qquad (5)$$

323) to solve Equation (5), introducing a substitution w to substitute $M^\circ k$ in Equation (5), resulting in Equation (6):

$$\min_k \|L \otimes k - I\|_2^2 + \lambda_2 \|w\|_2^2 + \lambda_2 \|k\|_2 + \lambda_3 \|M^\circ k - w\|_2^2 \qquad (6)$$

iteratively solving Equation (6) to obtain k and w;

324) setting the times of iteration; iteratively computing Equations (4) and (5) for multiple times, and solving the final blur kernel k.

7. The image deblurring method based on light streak information in an image according to claim 6, wherein the step of iteratively solving Equation (6) to obtain k and w comprises steps of:

first, with w being known, solving k using an Iterative Reweighted Least Squares approach through Equation (7):

$$\min_k \|L \otimes k - I\|_2^2 + \lambda_2 \|k\|_2 \qquad (7)$$

then, with k being known, solving w through Equation (8):

$$\min_k \lambda_1 \|w\|_2^2 + \lambda_3 \|M^\circ k - w\|_2^2 \qquad (8)$$

obtaining w as Equation (9):

$$w = \frac{\lambda_3 M \circ k}{\lambda_1 + \lambda_3} \qquad (9)$$

wherein the times of iteration is 20.

8. The image deblurring method based on light streak information in an image according to claim 1, wherein the non-blind deconvolution in step 4) adopts the non-blind restoration algorithm to restore a latent image, thereby obtaining a high-quality restored image;

wherein the non-blind deconvolution comprises:

regarding saturated pixel points and noise as singular points, wherein the saturated pixel points are outliers;

processing the singular pixel points separately from non-saturated pixel points; and iteratively optimizing outliers and a restored image using Expectation-Maximization (EM) algorithm, thereby obtaining a high-quality restored image.

9. The image deblurring method based on light streak information in an image according to claim 1, wherein the selecting an optimum image patch including an optimum light streak in the step 1) adopts a manual selection method, and the optimum image patch including the optimum light streak satisfies the following conditions:

(1) the optimum light streak comprises pixel points whose luminance is 70% higher than a maximum luminance value of the optimum image patch;

(2) the optimum light streak has a sparse distribution in the image patch;

(3) each optimum image patch has only one optimum light streak;

(4) a shape of the optimum light streak is similar to that of most other light streaks in the image, so as to avoid confusion between the optimum light streak and a streak-shaped luminous body region;

(5) one or more image patches with the lowest background luminance are selected from all image patches satisfying the (1)~(4) conditions as optimum image patches; and (6) except the light streak, no other structures with a close luminance to the light streak are existent in the optimum image patch, wherein the other structures include: one or more structures of a high-luminance luminous body, a plurality of light streaks included in one image patch, and a noticeable image edge.

* * * * *